United States Patent
Ogawa et al.

[11] Patent Number: 5,876,846
[45] Date of Patent: Mar. 2, 1999

[54] SELF-LUBRICATING DEVICE

[75] Inventors: Kazufumi Ogawa, Hirakata; Norihisa Mino, Settu; Mamoru Soga, Osaka, all of Japan

[73] Assignee: Matsushita Electric Industrial Co., Ltd., Osaka, Japan

[21] Appl. No.: 935,418

[22] Filed: Sep. 23, 1997

Related U.S. Application Data

[62] Division of Ser. No. 458,703, Jun. 2, 1995, Pat. No. 5,731,077, which is a division of Ser. No. 145,669, Nov. 4, 1993, Pat. No. 5,425,989, which is a continuation of Ser. No. 840,050, Feb. 24, 1992, abandoned.

[30] Foreign Application Priority Data

Feb. 27, 1991 [JP] Japan ................... 3-057902
Apr. 30, 1991 [JP] Japan ................... 3-098904
Apr. 30, 1991 [JP] Japan ................... 3-098908

[51] Int. Cl.$^6$ ...................................... B32B 7/04
[52] U.S. Cl. ............................. 428/333; 428/447
[58] Field of Search ..................... 428/333, 447

[56] References Cited

U.S. PATENT DOCUMENTS 5,011,963  4/1991  Ogawa et al. ................. 556/485
5,372,888  12/1994  Ogawa et al. ................. 428/422

*Primary Examiner*—D. S. Nakarani
*Attorney, Agent, or Firm*—Morrison & Foerster LLP

[57] ABSTRACT

A chemically adsorbed film having a surface layer containing fluorine groups and a stem layer chemically bonded by siloxane bonds to a substrate is formed on the surface of a frictional portion of a machine part such as a gear or a bearing or on the surface of a game ball. An excellently self-lubricating low frictional resistance machine part or game ball thus can be obtained. A frictional portion of a gear or the like, made of $SiO_2$ or like ceramic material, is dipped and held in a solution containing a surface active material, e.g., $$CF_3(CF_2)_7(CH_2)_2SiCl_3$$

dissolved in a non-aqueous solvent. A hydrochloric acid removal reaction is brought about between SiCl groups of the material, which contains a fluorocarbon and a chlorosilane group, and hydroxyl groups numerously present on the $SiO_2$ surface, thus forming bonds of $$CF_3(CF_2)_7(CH_2)_2Si(O{-})_3$$

over the entire frictional portion surface. A fluorine-containing monomolecular film thus is formed, which is chemically bonded to the substrate and has a thickness of about 1.5 nm.

3 Claims, 6 Drawing Sheets

SELF-LUBRICATING DEVICE

This application is a division of application Ser. No. 08/458,703, filed Jun. 2, 1995, now U.S. Pat. No. 5,731,077, which is a division of application Ser. No. 08/145,669, now U.S. Pat. No. 5,425,989, filed Nov. 4, 1993, which is a continuation of application Ser. No. 07/840,050, filed Feb. 24, 1992, now abandoned.

FIELD OF THE INVENTION

This invention relates to machine parts offering low frictional resistance and, more particularly, to self-lubricating micro-machines or like machine parts. It also relates to audio and video devices offering low frictional resistance. It further relates to game balls and, more particularly, to game balls such as those used in the pachinko, smart ball, pin ball, roulette and bowling games provided with a lubricating coated film.

BACKGROUND OF THE INVENTION

Usual frictional machine parts such as gears, bearings, rotors, shafts, crankshafts and turbines require lubrication. If the lubricant supply ceases or becomes insufficient, heat is produced at frictional portions, leading to wear or rupture of such portions. Depending on the purpose of the machine, however, there are cases where no lubricant can be used, or where great limitations are imposed on the use of lubricant. For example, in devices for manufacturing foods or medicines, great care is paid lest lubricant should be occasionally introduced into the products. Great care is also paid in the case of medical devices. Further, timepieces or the like, which are used by general consumers, require lubricants for prolonged use.

Further, micro-machines (i.e., minutia precision machines) comprising parts of about 1 mm or less in size, can not use any lubricant because of the extremely small size of the parts. Making the surface as smooth as possible is the sole way of providing for a satisfactory frictional property of micro-machines.

With general machine parts, however, the possibility of hazardous leakage of the lubricant exists even if great care is taken. With timepieces or the like, which are used by general consumers, it is practically impossible to use a lubricant. The surface of micro-machine parts may be made smooth by a photo-lithographic process. In this case, however, limitations are imposed, and currently sufficient durability can not be obtained.

At any rate, it has been impossible to obtain a high performance machine part offering low frictional resistance.

In another aspect, in tape recorders, VTRs, DATs and other recording/reproducing devices, in which magnetic tapes are driven, great care is taken lest scars or scratches are produced on the tapes during running. Scars or scratches produced on the recording medium will interfere with necessary functions of recording and reproduction. Further, scars or scratches produced on the back surface of the recording medium will undesirably cause transferred scars or scratches when a medium such as a tape is wound.

VTRs and DATs are multi-functional and high performance devices. They are particularly required to have long life and be highly reliable. VTR cylinder heads are rotated at high speeds of about 1,000 to 6,000 rpm. Therefore, if abnormalities occur in the rotating mechanism, the image reproduction or reliability is greatly affected, and trouble in the rotating mechanism will cause defective reproduction.

Generally, frictional parts such as bearings, rotors, shafts, crankshafts and turbines require a supply of lubricant. If the lubricant supply ceases or becomes insufficient, the frictional sections generate heat, leading to wear and rupture.

To avoid such difficiencies, it has heretofore been the practice to make only the frictional surface in contact with the running tape as smooth as possible. In addition, to enhance the lubricating property of the frictional surface of a device, it has been typical practice only to coat the frictional surface with lubricant or to make the frictional surface as smooth as possible.

However, making the frictional surface as the contact surface of the running tape as smooth as possible also reduces the friction of the tape during running. In addition, where lubricant is supplied to the frictional surface of the device, the possibility of lubricant leakage exists. If oil leakage occurs in a VTR cylinder head bearing section, lubricant is spattered onto nearby parts due to high speed rotation. This can affect the VRT tape or the like adversely. Besides, there is a limitation on making smooth the frictional surface itself.

In a further aspect, game balls such as those for pachinko, smart ball and bowling games can be readily contaminated. If they are contaminated, they may fail to roll smoothly, or may cause clogging of the game machine during the game, or they will be worn out to deteriorate their slip. Therefore, it is necessary to make the game ball surface as smooth as possible to permit smooth rolling by washing or polishing. Heretofore, game balls are polished with cloth or the like, and in game places this operation is continued until late at night. Further, it is well known to increase the lubricity of the ball surface by making the surface as smooth as possible or coating a lubricant on the surface.

However, limitations are imposed on permitting smooth rotation of game balls by making the surface smooth during the molding process. In addition, where a lubricant is coated, the lubricant film can be separated or worn out during use.

SUMMARY OF THE INVENTION

An object of the invention is to provide a machine part, which offers low frictional resistance and is excellently self-lubricating.

Another object of the invention is to provide an audio or video apparatus, which has a lubricating film capable of reducing the frictional resistance offered to the running tape and having excellent durability.

A further object of the invention is to provide an audio or video apparatus, which has a lubricating film chemically bonded to the frictional surface of the apparatus, offering low frictional resistance and is excellently self-lubricating.

A still further object of the invention is to provide a game ball, which has its surface provided with a lubricating film having a uniform thickness at the nanometer level, wherein the film is excellently durable, wear-proof, lubricating and water- and oil-repelling.

An objective of the invention is to provide a self-lubricating device comprising a chemically adsorbed film as a surface layer covalently bonded to the device by —Si— bonds, and the chemically adsorbed film contains fluorocarbon chain groups or hydrocarbon chain groups.

It is preferable in this invention that the chemically adsorbed film is a monomolecular film or polymer film.

It is preferable in this invention that the device is a slide member of a machine part.

It is preferable in this invention that the device is a micro-machine.

It is preferable in this invention that the device is selected from the group consisting of an audio or a video apparatus.

It is preferable in this invention that the device is a travelling magnetic tape contact member which is selected from the group consisting of a magnetic head surface and a tape guide surface.

It is preferable in this invention that the device is a rotational mechanism including at least a frictional surface portion of a cylinder head.

It is preferable in this invention that the device is a game ball.

It is preferable in this invention that the fluorocarbon chain or hydrocarbon chain containing the chemically adsorbed film is laminated to a siloxane-based inner layer, the inner layer being bonded by covalent bonds to the surface of the device, the inner layer and the chemically adsorbed film being bonded together by covalent bonds.

It is preferable in this invention that the inner layer is a monomolecular film or polymer film.

DETAILED DESCRIPTION OF THE INVENTION

Figure 1:
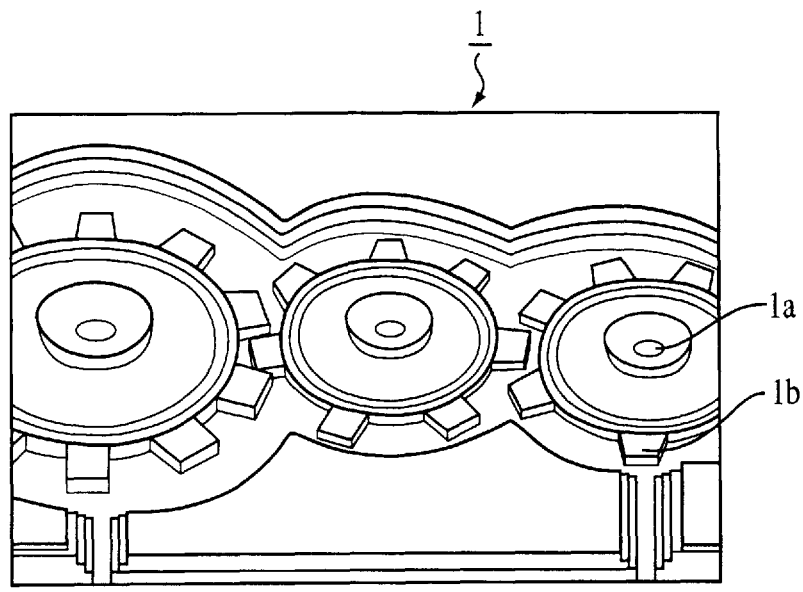
FIG. 1 is a perspective view, showing a micro-machine as in example 1 of the invention.
Figure 2:
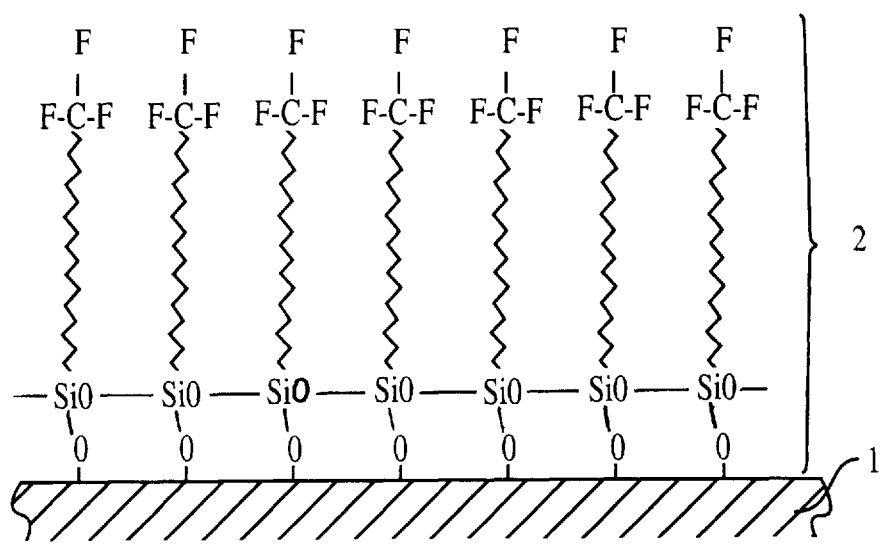
FIG. 2 is a schematic sectional view, enlarged to a molecular level, showing the surface of a micro-machine device after formation of a fluorocarbon-coating monomolecular film has in example 1 of the invention.

According to the invention, a chemically adsorbed film is formed on the surface of at least a frictional portion of a machine part. The film includes a surface layer containing fluorine groups and the base layer chemically bonded by siloxane bonds to the substrate, i.e., the portion of the machine part. The machine part offers low frictional resistance and is excellently self-lubricating. The surface layer of the chemically adsorbed film contains fluoroalkyl groups, and the film offers low resistance and is excellently self-lubricating. In addition, since the stem layer of the chemically adsorbed film is chemically bonded by siloxane bonds to the substrate, the film is excellently durable. It doses not readily separate from the substrate surface even when the surface is rubbed repeatedly. Further, it has a very small thickness on the order of nanometers to angstroms and dose not spoil the dimensional accuracy of the processed machine part.

Further, in a preferred embodiment of the invention, the chemically adsorbed film is a monomolecular film which is excellently transparent and dose not spoil the mechanical properties of the machine part.

Further, the invention is applicable to a micro-machine as a machine part. Thus, it is possible to make the micro-machine self-lubricating without using any lubricant, and to make the machine part excellently durable.

The machine part, to which the invention is applicable, may be made of any material such as metals, ceramics and plastics. In addition, it may be of any kind. The following description concerns micro-machines. Among micro-machine parts are gears, rotors, shafts, crankshafts, turbines with sizes of about 1 mm and less.

Usual micro-machine parts are made of ceramics and metals, and have a surface oxide film containing hydroxyl groups. Thus, a laminated chemically adsorbed monomolecular film based on carbon fluoride can be formed on a micro-machine part frictional portion surface by a step of contacting the frictional portion surface with a non-aqueous solvent containing molecules having a straight carbon chain having a chlorosilane group ($SiCl_nX_{3-n}$, n representing 1, 2 or 3, X representing a functional group) at one end, e.g., a chlorosilane-based surface active material containing a carbon fluoride group and a chlorosilane group, to precipitate a monomolecular film of the surface active material on the frictional portion surface by a reaction between hydroxyl groups at the frictional portion surface and the material, or contacting the frictional portion surface with a non-aqueous solvent containing a material containing a plurality of chlorosilyl groups to precipitate the material containing a plurality of chlorosilyl groups on the frictional portion surface by a reaction between hydroxyl groups of the frictional portion surface and chlorosilyl groups of the material; a step of washing away excess material containing a plurality of chlorosilyl groups remaining on the frictional portion surface by using a non-aqueous organic solvent to obtain a siloxane-based monomolecular film of the material containing a plurality of siloxane groups on the frictional portion surface; and a step of forming a laminated chemically adsorbed monomolecular film on the frictional portion surface by chemically adsorbing a silane-based surface active material containing a straight carbon chain having a chlorosilane group at one end.

In this way, a monomolecular film based on carbon fluoride having a thickness at the nanometer level can be formed on the micro-machine frictional surface portion without spoiling the functions intrinsic to the micro-machine part. In addition, the film has excellent frictional properties and permits reduction of frictional resistance offered by the surface. It is thus possible to provide a micro-machine, which is subject to less wear and highly reliable. Further, the micro-machine according to the invention does not require any lubricant. Furthermore, the monomolecular film formed is biocompatible, and thus the micro-machine can be inserted into a human body.

Examples of trichlorosilane-based surface active materials of the present invention include
$CF_3(CF_2)_7(CF_2)_2SiCl_3$,
$CF_3CH_2O(CH_2)_{15}SiCl_3$,
$CF_3(CH_2)_2Si(CH_3)_2(CH_2)_{15}SiCl_3$,
$F(CF_2)_4(CH_2)_2Si(CH_3)_2(CH_2)_9SiCl_3$,
$F(CF_2)_8(CH_2)_2Si(CH_3)_2(CH_2)_9SiCl_3$,
$CF_3COO(CH_2)_{15}SiCl_3$,
$CF_3(CF_2)_5(CH_2)_2SiCl_3$,
$CH_3(CH_2)_9SiCl_3$,
$CH_3CH_2O(CH_2)_{15}SiCl_3$,
$CH_3(CH_2)_2Si(CH_3)_2(CH_2)_{15}SiCl_3$,
$CH_3(CH_2)_6Si(CH_3)_2(CH_2)_9SiCl_3$,
$CH_3(CH_2)_{10}Si(CH_3)_2(CH_2)_9SiCl_3$,
$CH_3COO(CH_2)_{15}SiCl_3$.

Examples of lower-alkyl substituted monochlorosilane- or dichlorosilane-based surface active materials of the present invention include
$CF_3(CF_2)_7(CH_2)_2SiCl_n(CH_3)_{3-n}$, $CF_3CH_2O(CH_2)_{15}SiCl_n(CH_3)_{3-n}$, $CF_3(CF_2)_7(CH_2)_2SiCl_n(C_2H_5)_{3-n}$, $CF_3(CH_2)_2Si(CH_3)_2(CH_2)_{15}SiCl_n(CH_3)_{3-n}$, $CF_3CH_2O(CH_2)_{15}SiCl_n(C_2H_5)_{3-n}$, $CF_3(CF_2)_3(CH_2)_2Si(CH_3)_2(CH_2)_9SiCl_n(C_2H_5)_{3-n}$, $CF_3(CF_2)_7(CH_2)_2Si(CH_3)_2(CH_2)_9SiCl_n(CH_3)_{3-n}$, $CF_3(CF_2)_5(CH_2)_2SiCl_n(CH_3)_{3-n}$, $CF_3COO(CH_2)_{15}SiCl_n(CH_3)_{3-n}$
where n represents 1 or 2.

Among these examples, trichlorosilane-based surface active materials are preferred in that chlorosilyl bonds other than those bonded to their hydrophilic groups form intermolecular bonds with adjacent chlorosilane groups by siloxane bonds, thereby permitting formation of a more firmly adsorbed film.

Trichlorosilane-based surface active materials are particularly preferred because chlorosilyl bonds other than those coupled to their hydrophilic groups form inter-molecular bonds with adjacent chlorosilane groups with siloxane bonds and thus permit formation of a more firmly adsorbed film. Further,

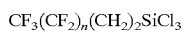
$CF_3(CF_2)_n(CH_2)_2SiCl_3$ where n represents an integer, most suitably 3 to 25, is preferred because of its solubility and its water-repelling, anti-contaminating and other functional properties. Further, with an ethylene or acetylene group added to or incorporated in the alkyl fluoride chain portion, the chemically adsorbed film may be crosslinked after formation by irradiating it with an electron beam of about 5 Mrads, thus further improving the hardness of the chemically adsorbed film.

It is thus possible to further improve the hardness of the chemically adsorbed film.

The chlorosilane-based surface active material capable of use according to the invention is not limited to those in the form of a straight chain as noted above. It is possible to use a branched alkyl fluoride or hydrocarbon group or those having a substituted alkyl fluoride or hydrocarbon group with silicon at one end (i.e., those represented by the formula

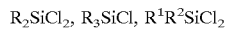
$R_2SiCl_2$, $R_3SiCl$, $R^1R^2SiCl_2$ or $R^1R^2R^3SiCl$ where R, $R^1$, $R^2$ and $R^3$ represents an fluorocarbon group or hydrocarbon group). To increase the adsorption density, however, the straight chain form is preferred.

Further, by chemically adsorbing a material for forming an inner layer material having a plurality of chlorosilyl groups, e.g., $SiCl_4$, $SiHCl_3$, $SiH_2Cl_2$, and $Cl(SiCl_2O)_nCl_3$ (where n represents an integer in a range from 1 to 20), $SiCl_m(CH_3)_{4-m}$, $SiCl_m(C_2H_5)_{4-m}$ (where m represents 1, 2 or 3), and $HSiCl_p(CH_3)_{3-p}$, $HSiCl_p(C_2H_5)_{3-p}$ (where p represents 1 or 2), and then reacting it with water, surface chlorosilyl bonds are converted to hydrophilic silanol bonds, thus making the polymer composition hydrophilic. Among the materials containing a plurality of chlorosilyl groups, tetrachlorosilane ($SiCl_4$) is preferred in that it is highly reactive and low in molecular weight. It can, therefore, provide silanol bonds at a high density. In this way, it is possible to provide a highly hydrophilic composition compared to oxidation treatment of a polymer-containing substrate. To this surface, a chlorosilane-based surface active material containing fluoroalkyl groups may be chemically adsorbed. In this way, a chemically adsorbed film suitably having an increased density can be obtained.

With a machine part consisting of a plastic molding, a chemically adsorbed film containing fluoroalkyl groups is formed on the plastic molding surface via siloxane bonds. The method of forming the film suitably comprises a step of making the plastic molding surface hydrophilic by oxidation treatment, and a step of chemically adsorbing a chlorosilane-based surface active material to the oxidized surface by contacting the surface with a non-aqueous organic solvent by means of dipping, thus forming a chemically adsorbed film containing fluoroalkyl groups via siloxane bonds.

The plastic material may be oxidized by ordinary means, e.g., oxygen plasma treatment, corona treatment, and dipping into a mixed solution containing concentrated sulfuric acid and potassium dichromate (i.e., a chromium-containing blend solution treatment).

The non-aqueous solvent to be used according to the invention may be any organic solvent, which does not dissolve the plastic material with the chemically adsorbed film to be formed thereon and is free from active hydrogen able to react with the chlorosilane-based surface active material. Suitable examples of the solvent are fluorine-based solvents, e.g., 1,1,dichloro-1-fluoroethane, 1,1-dichloro-2,2,2-trifluoroethane, 1,1-dichloro-2,2,3,3,3-pentafluoropropane, 1,3-dichloro-1,1,2,2,3-heptafluoropropane, etc., hydrocarbon-based solvents, e.g., hexane, octane, hexadecane, cyclohexane, etc., ether-based solvents, e.g., dibutylether, dibenzylether, etc., and ester-based solvents, e.g., methyl acetate, ethyl acetate, isopropyl acetate, amyl acetate, etc.

According to the invention, a chemically adsorbed film is formed on a support surface as a running tape surface. The chemically adsorbed film includes a surface layer containing fluorine groups and a stem layer chemically bonded to the surface by siloxane bonds. Thus, it is possible to reduce the frictional resistance during running of the tape and prevent scars and scratches from being produced on the tape.

Further, since the chemically adsorbed film is formed on the surface of a lubricating section of the audio or video device, it is possible to provide a device, which offers low frictional resistance and is excellently self-lubricating. That is, because of fluoroalkyl groups present in the surface layer of the chemically adsorbed film, the frictional resistance, i.e., frictional resistance during tape running, can be reduced, and the frictional section of the device may be made excellently self-lubricating. Further, since the chemically adsorbed film has its stem layer chemically bonded by siloxane bonds to the substrate surface, it can be excellently durable and will not separate from the substrate surface even after repeated running or friction generation at the surface. Further, since the chemically adsorbed film according to the invention has a thickness on the order of nanometers to angstroms, it does not spoil the dimensional accuracy of the processed machine.

Further, with the preferred chemically adsorbed film monomolecular film, a film having a uniform thickness can be obtained which is excellently transparent and does not spoil mechanical characteristics.

Since a monomolecular film based on carbon fluoride and having a thickness at the nanometer level can be formed on the surface of a VTR cylinder head, the intrinsic functions of the head are not spoiled. In addition, the film has excellent frictional properties and frictional resistance of the surface is reduced. It is thus possible to provide a VTR cylinder head which has less frictional resistance, is highly reliable and does not need any lubricant.

According to the invention, a chemically adsorbed film is formed on a game ball surface such that it is chemically bonded to the surface by siloxane bonds. The film offers low frictional resistance, when the ball is rolling, is excellently lubricating and can prevent generation of scars and scratches. Since its surface layer contains fluoroalkyl groups, it offers low frictional resistance, i.e., low frictional resistance at the time of rolling, and is excellently water- and oil-repelling and anti-contaminating. Further, since chemical bonds are formed via siloxane bonds, it is excellently durable. Thus, it does not readily separate from the substrate surface even if the surface is repeatedly rolled or moved frictionally. Further, since its thickness is on the order of nanometers to angstroms, it does not spoil the dimensional accuracy of the processed game ball. Further, with the preferred chemically adsorbed monomolecular film, a uniformity thin and excellently transparent film can be obtained.

Preferred substrates according to the invention include game balls such as those used for pachinko, smart ball, pin ball, roulette, bowling and like games. Usually, a metal substrate contains hydroxyl groups at the surface. However, in case of a resin or like substrate or where a metal surface does not contain so many exposed hydroxyl groups, the surface may be treated by a plasma treatment or irradiation with ultraviolet rays or provided with a siloxane layer, thus providing many hydroxy groups exposed at the surface. Then, a laminated chemically adsorbed monomolecular film based on carbon fluoride, may be formed on the substrate surface by a step of contacting the substrate surface with a non-aqueous solvent containing molecules containing a straight carbon chain having a chlorosilane group ($SiCl_n X_{3-n}$, n representing 1, 2 or 3, X representing a functional group) at one end, e.g., a chlorosilane-based surface active material containing a fluorocarbon and a chlorosilane group for a reaction between hydroxyl groups at the substrate surface and chlorosilyl groups of the surface active material to precipitate a monomolecular film on the substrate surface, or contacting the substrate with a non-aqueous solvent containing a surface active material containing a plurality of chlorosilyl groups for a reaction between hydroxyl groups at the substrate surface and chlorosilyl groups of the surface active material to cause precipitate of a monomolecular film on the substrate surface; a step of washing away excess material containing a plurality of chlorosilyl groups from the substrate surface to obtain a siloxane-based monomolecular film containing a plurality of chlorosilyl groups on the substrate; and a step of chemically adsorbing a silane-based surface active material containing a straight carbon chain having a chlorosilane group at one end to the substrate to form a laminated chemically adsorbed monomolecular film.

Thus, a fluorocarbon-based monomolecular film having a thickness at the nanometer level can be formed on the game ball surface without causing any change in the dimension or shape of the game ball. This film has an excellent frictional property and permits reduction of the frictional resistance of the surface. It is thus possible to obtain a film, which offers less frictional resistance and is highly reliable and excellently water- and oil-repelling and anti-contaminating.

EXAMPLE 1

A processed micro-machine 1 (with a gear 1a and a shaft 1b) made of $SiO_2$ and having a diameter of 100 microns was prepared (FIG. 1) and washed with an organic solvent. Then, a solvent containing a material containing a fluorocarbon and a chlorosilane group was prepared by dissolving about 2% of

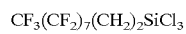

in, for example, a mixed solvent composed of 80% of n-hexadecane (or toluene or xylene or dicyclohexyl), 12% of carbon tetrachloride and 8% of chloroform. At least a frictional portion 1 of the micro-machine (or the whole micro-machine) was dipped and held in the solution for about 2 hours. Thus, a dehydrochlorination reaction was brought about between hydroxyl groups numerously present at the surface and the $SiO_2$ and —SiCl groups of the material containing a fluorocarbon and a chlorosilane group, thus producing bonds of represented by by formula 1

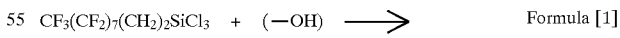

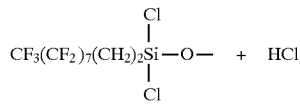

at the film surface. The film was then washed with chloroform to remove unreacted material remaining on the surface, followed by washing with water or exposing to air containing moisture. The —SiCl group was changed to a —SiOH group as the formula [2].

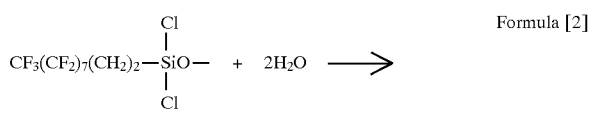

Formula [2]

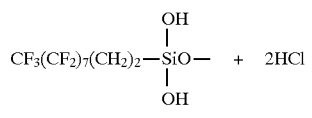

Each silanol group (—SiOH) was then dehydrochlorinated and crosslinked to form a siloxane bond (—SiO—) after drying as in the formula [3]. Drying temperature may be room temperature or above.

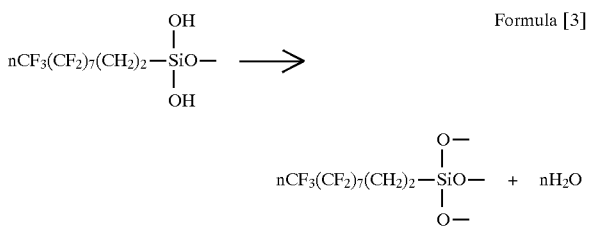

Formula [3]

A fluorine-containing monomolecular film 2 could be formed over the entire surface of the frictional section. It was chemically bonded to the gear and shaft and had a thickness of about 15 angstroms (1.5 nm). The threshold surface energy of the film was measured (measuring instrument: "Automatic Contact Angle Gauge Model CA-Z" by Kyowa Kaimen Kagaku Co., Ltd.) and found to be 15 dynes/cm. The dynamic friction coefficient was found to be 0.15 (measuring instrument: "Fully Automatic Dynamic Friction Coefficient Gauge Model DFPM-SS" by Kyowa Kaimen Kagaku Co., Ltd.)

This monomolecular film was sufficiently thin compared to the dimensions of the gear and shaft. In addition, since it contained fluorocarbon groups, it was highly lubricating. Further, since it was firmly chemically bonded, it could withstand high speed rotation and did not separate. Further, the gear was tested by rotating it by 10,000 rotations, and it could withstand about 30 times the number of rotations in the case of a non-treated gear.

The above washing step with the chloroform was omitted, and a fluorocarbon polymer film was adsorbed to the substrate. The fluorocarbon-based polymer film was in satisfactorily close contact with the substrate. The film exhibited low frictional resistance and was excellently self-lubricating.

EXAMPLE 2

Figure 3:
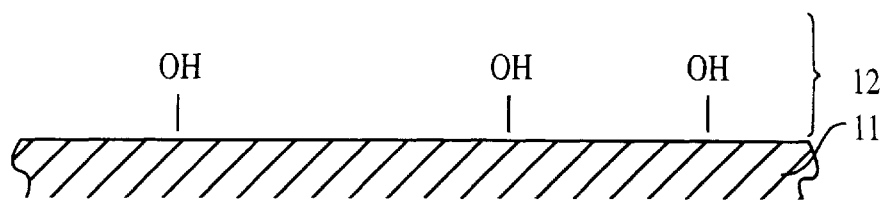
FIG. 3 is a schematic sectional view, enlarged to a molecular level, showing the surface of the micro-machine device as in example 2 of the invention.

A part made of alumina (or such metal as stainless steel), which contains less hydroxyl groups although it is hydrophilic, was treated. The alumina part 11 was dipped and held for about 30 minutes in a solution prepared by dissolving 1% by weight of a material containing a plurality of chlorosilyl groups, e.g., $SiCl_4$ being small in molecular size and greatly reactive with respect to hydroxyl groups, thus having a great effect of rendering the surface uniformly hydrophilic in a non-aqueous solvent, e.g., chloroform solvent. As a result, a dehydrochlorination reaction was brought about due to hydrophilic —OH groups 12 more or less present at the surface of the alumina part 1 (FIG. 3), whereby a chlorosilane monomolecular film of the material containing a plurality of trichlorosilyl groups was formed.

As an example, using $SiCl_4$ as the material containing a plurality of chlorosilyl groups, a hydrochloric acid removal reaction was brought about on the surface due to a small quantity of hydrophilic —OH groups being exposed at the part surface 11. Molecules as represented by formulas 4 and/or 5 were formed.

[Formula 4]

[Formula 5]

These bonds were connected to the surface by —SiO— bonds.

Figure 4:
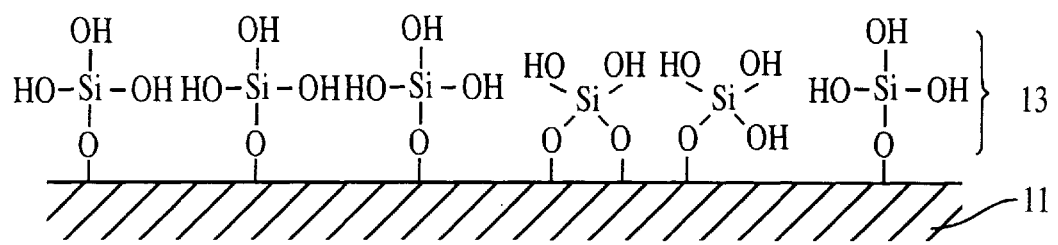
FIG. 4 is a schematic sectional view, showing the surface of the micro-machine device provided with a chemically adsorbed film (inner layer) containing a plurality of silanol bonds as in example 2 of the invention.

Subsequently, the part was washed with a non-aqueous solvent, e.g., chloroform to remove unreacted $SiCl_4$ molecules, and then with water thus obtaining a siloxane monomolecular film 13 (FIG. 4) on the part surface as shown by formulas 6 and/or 7.

[Formula 6]

[Formula 7]

The above washing step with the chloroform was omitted, and a siloxane-based polymer film was adsorbed to the substrate. The siloxane-based polymer film was in satisfactorily close contact with the substrate.

The monomolecular film 13 was completely bonded by chemical bonds of —SiO— to the part surface and did not separate. In addition, its surface contained numerous silanol (—SiOH) bonds corresponding to about three times the initial number of hydroxyl groups.

As a further example, a part provided with a monomolecular film formed on its surface and containing numerous SiOH bonds, was dipped and held for about one hour in a non-aqueous solution containing a material containing a fluorocarbon and a chlorosilane group, e.g., a solution prepared by dissolving about 3 wt. % of

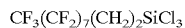

in a solvent containing 80 wt. % of n-hexadecane, 12 wt. % of carbon tetrachloride and 8 wt. % of chloroform. The film was then washed with chloroform to remove unreacted material remaining on the surface, followed by washing with water or exposing to air containing moisture. As a result, bonds of

Figure 5:
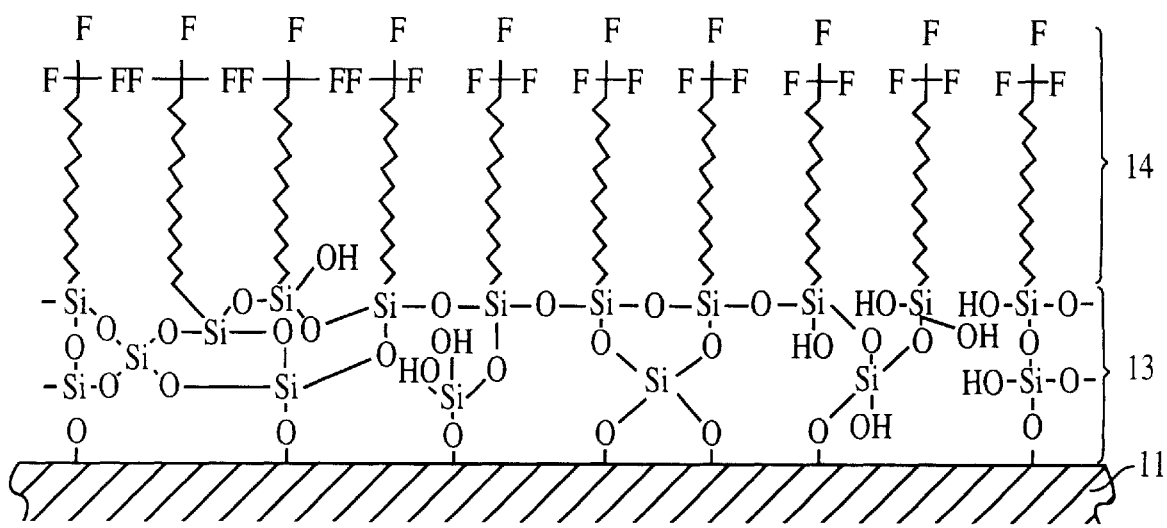
FIG. 5 is a schematic sectional view, enlarged to a molecular level, showing the surface of the micro-machine device after formation of a fluorine-coating monomolecular film as in example 2 of the invention.

were formed on the surface, and a fluorine-containing monomolecular film 14 was formed as above in formulas 1 to 3. The film was densely formed over the entire part surface and chemically bonded to the inner siloxane monomolecular film. Its thickness was about 1.5 nm (FIG. 5). This laminated monomolecular film did not separate in a peel-off test. It offered about one half the frictional resistance compared to directly forming the fluorine-containing monomolecular film on the part surface.

While the above embodiment used

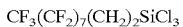

as the fluorine-containing surface active material, if an ethylene or acethylene group is added to or incorporated in the alkyl chain part, crosslinking can be obtained by irradiation with an electron beam at 5 Mrad. after the monomolecular film formation. The hardness of the film thus can be further improved. As shown in the above example, a lubricating fluorocarbon-based monomolecular film having a nanometer level thickness, which is sufficiently small compared to the micro-machine part dimensions, is formed on the micro-machine part frictional portion surface, and the intrinsic functions of the micro-machine are not spoiled. Further, the fluorocarbon-based monomolecular film is biocompatible, can offer very low frictional resistance, and does not separate or wear out. Thus, it is very effective for a micro-machine which is used inside the human body, and in which no lubricant can be used.

According to the invention of a chemically adsorbed film, which includes a surface layer containing fluorine and a stem layer chemically bonded by siloxane bonds to the substrate, is formed on at least a frictional portion surface of a machine part. Thus, it is possible to provide a machine part which offers low frictional resistance and is excellently self-lubricating.

Further, with the preferred chemically adsorbed monomolecular film, a thin film having a uniform thickness can be obtained which is excellently transparent and does not spoil the dimensional accuracy of the processed machine.

Further, with the preferred micro-machine as a machine part, self-lubricating properties and excellent durability can be provided so that no lubricant need.

EXAMPLE 3

A shaft 21, a rotational cylinder 22 and a bearing 33 of a processed VTR cylinder head (FIG. 6) were washed with an organic solution. A non-aqueous solution containing a material containing a fluorocarbon and a chlorosilane group, was prepared by dissolving, for example, about 2 wt. % of

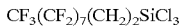

in a blend solvent composed of 80% a by weight of n-hexadecane (or toluene or xylene or dichlorohexyl), 12% by weight of carbon tetrachloride and 8% by weight of chloroform. The shaft 21, rotational cylinder 22 and bearing 23 were dipped and held for about 2 hours in the solution. As a result, a dehydrochlorination reaction was brought about between hydroxyl groups numerously contained at the surface of a natural oxide film 24 on the surface of the shaft 21, rotational cylinder 22 and bearing 23 and the —SiCl groups in the material containing a fluorocarbon and a chlorosilane group. The film was then washed with chloroform to remove unreacted material remaining on the surface, followed by washing with water or exposing to air containing moisture. As a result, bonds of

Figure 8:
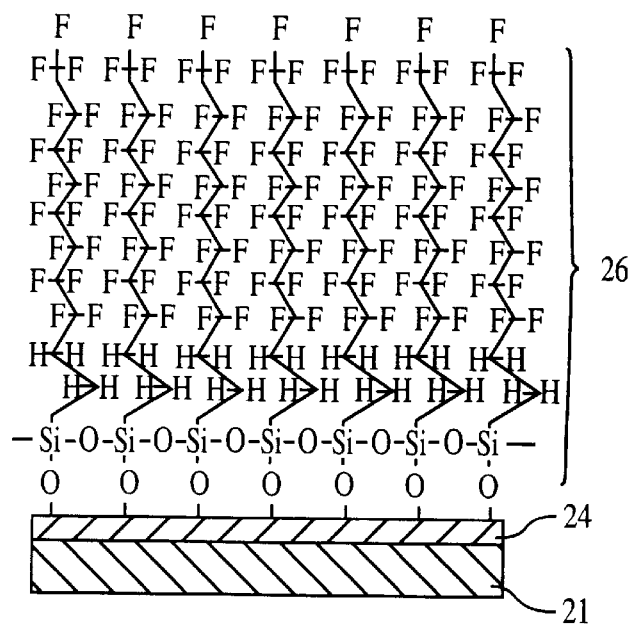
FIG. 8 is a schematic sectional view, enlarged to a molecular level, showing the surface of the VTR cylinder head after formation of a fluorocarbon-coating monomolecular film as in example 3 of the invention.

were formed on the surface, and a fluorine-containing monomolecular film 26 was formed same as above formulas 1 to 3. The film was chemically bonded to the surface of the shaft 21, rotational cylinder 22 and bearing 23 and had a thickness of about 1.5 nm (FIG. 8).

The threshold surface energy of the film was measured (measuring instrument: "Automatic Contact Angle Gauge Model CA-Z" by Kyowa Kaimen Kagaku Co., Ltd.) and found to be 15 dynes/cm. The dynamic friction coefficient was found to be 0.15 (measuring instrument: "Automatic Dynamic Friction Gauge Model DFPM-SS" by Kyowa Kaimen Kagaku Co., Ltd.).

This monomolecular film was sufficiently thin compared to the dimensions of the shaft, rotational cylinder and bearing. In addition, it contained fluorocarbon groups and was highly lubricating. Further, it was very firmly chemically bonded, and thus withstood high speed rotation and did not separate. Further, the shaft 21, rotational cylinder 22 and bearing 23 were assembled into a VRT cylinder head which was then tested by rotating it at 2,500 rpm. The head could withstand use for about double the period compared to a non-treated head.

EXAMPLE 4

Figure 9:
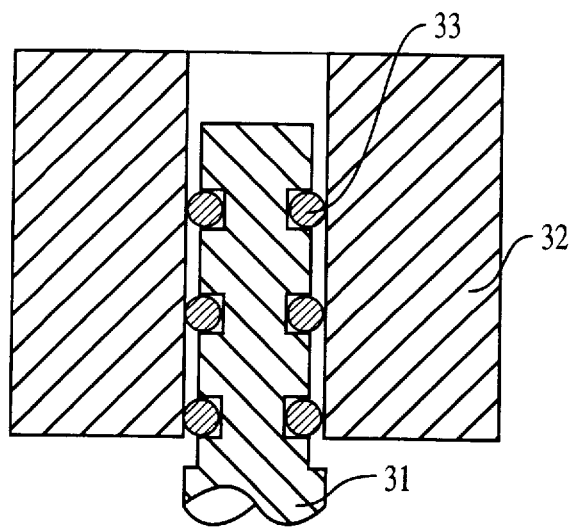
FIG. 9 is a schematic sectional view, showing a VTR cylinder head as in example 4 of the invention.
Figure 10:
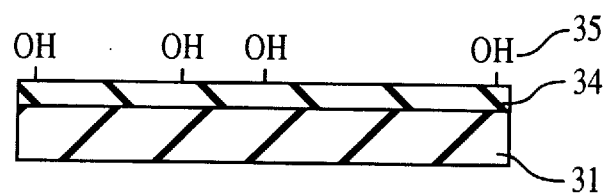
FIG. 10 is a schematic sectional view, enlarged to a molecular level, showing the surface of the VTR cylinder head as in example 4 of the invention.

This example concerns a VTR cylinder head made of a material, which contains less hydroxyl groups although it is hydrophilic. The VRT cylinder head, like Example 3, comprised a shaft 31, a rotational cylinder 32 and a bearing 33 (FIG. 9). These parts were dipped and held for about 30 minutes in a solution prepared by dissolving 1% a by weight of a material containing a plurality of chlorosilyl groups, e.g., $Cl(SiCl_2O)_2SiCl_3$ being small in molecular size and highly reactive with respect to the hydroxyl groups, thus having a great effect of making the surface of the shaft 31, rotational cylinder 32 and bearing 33 uniformly hydrophilic, in a non-aqueous solvent, e.g., chloroform solvent. As a result, a dehydrochlorination reaction was brought about on the surface of the shaft, rotational cylinder and bearing due to hydrophilic —OH groups 35 being more or less present at the surface, thus forming a chlorosilane monomolecular film of the material containing a plurality of chlorosilyl groups.

As an example, a dehydrochlorination reaction was brought about on the VTR cylinder shaft surface 34 due to a small quantity of hydrophilic —OH groups 35 being exposed at the surface. Bonds as represented by formulas 8 and/or 9 were thus secured to the surface by —SiO— bonds.

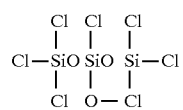
[Formula 8]

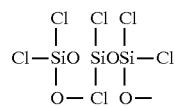
[Formula 9]

Figure 11:
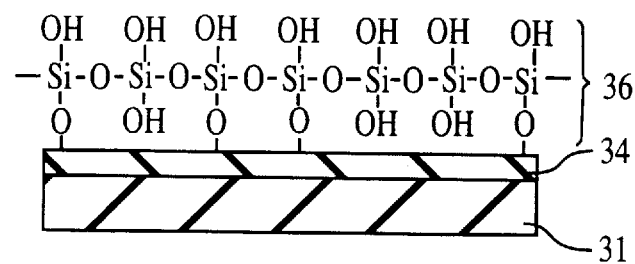
FIG. 11 is a schematic sectional view, showing the surface of the VTR cylinder head provided with a chemically adsorbed film (inner layer) containing a plurality of silanol bonds as in example 4 of the invention.

Subsequently, the shaft was washed with a non-aqueous solvent, e.g., chloroform, and then with water, thus obtaining on the part surface a siloxane monomolecular film 36 (FIG. 11) as represented by formulas 10 and/or 11.

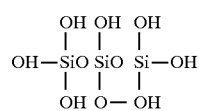
[Formula 10]

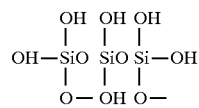
[Formula 11]

The monomolecular film 36 thus formed was perfectly bonded to the VTR cylinder shaft via chemical bonds of —SiO— and did not separate. This monomolecular film had numerous —SiOH bonds present at the surface and corresponded to about 6 to 7 times the initial number of hydroxyl groups.

Figure 12:
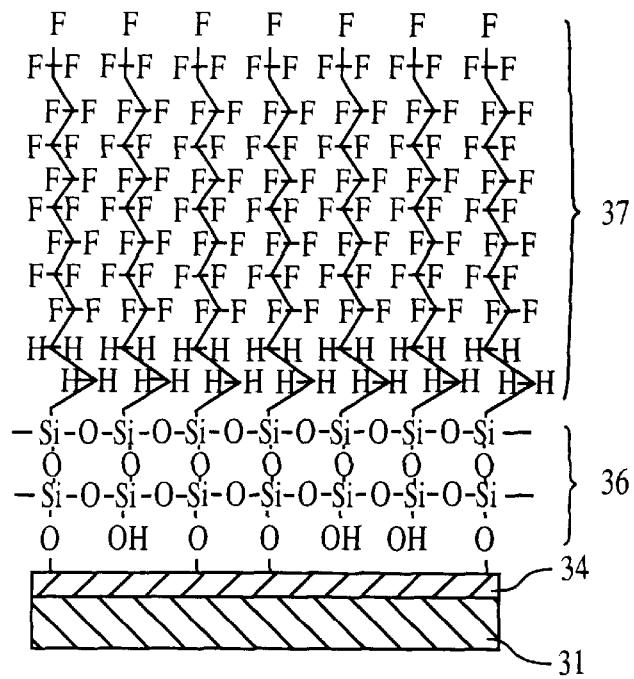
FIG. 12 is a schematic sectional view, enlarged to a molecular level, showing the surface of the VTR cylinder head after formation of a fluorine-coating monomolecular film as in example 4 of the invention.

Further, the VTR cylinder shaft provided with the monomolecular film having numerous —SiO bonds at the surface, was dipped and held for about one hour in a non-aqueous solution containing a material containing a fluorocarbon and a chlorosilane group, e.g., a solution prepared by dissolving about 2% by weight of $CF_3(CF_2)_7(CH_2)_2SiCl_3$, in a solvent containing 80% by weight of n-hexadecane, 12% by weight of carbon tetrachloride and 8% by weight of chloroform. The film was then washed with chloroform to remove unreacted material remaining on the surface, followed by washing with water or exposing to air containing moisture. As a result, bonds of $$CF_3(CF_2)_7(CH_2)_2Si(O-)_3$$

were formed on the surface, and a fluorine-containing monomolecular film 37 was formed as above in formulas 1 to 3. The film was chemically bonded to the inner siloxane monomolecular film 36 and had a thickness of about 1.5 nm (FIG. 12). The monomolecular film did not separate in a peel-off test.

The frictional resistance of the film was about one fold compared to a fluorine-containing monomolecular film being formed directly on the part surface.

As shown in the above example, the VTR cylinder shaft was contacted with a non-aqueous solution containing a chlorosilane-based surface active material containing a fluorocarbon and a chlorosilane group to cause a reaction between hydroxyl groups at the shaft surface and chlorosilyl groups so as to precipitate a monomolecular film on the substrate surface. The fluorocarbon-based monomolecular film thus formed has a thickness at the nanometer level and is chemically bonded to the head surface. Thus, it does not spoil the intrinsic functions of the VTR cylinder shaft, and it is possible to obtain a VTR cylinder shaft which has excellent frictional properties, offers low frictional resistance and is excellently self-lubricating and durable.

EXAMPLE 5

Figure 6:
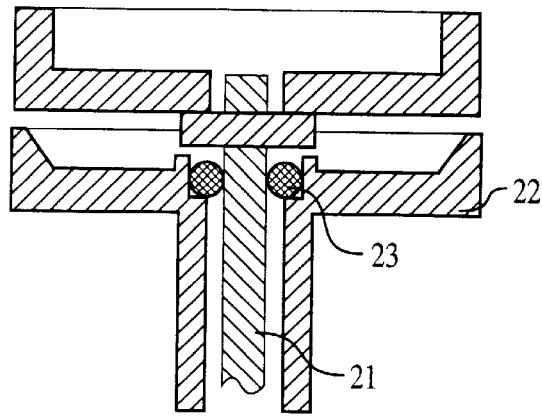
FIG. 6 is a schematic sectional view, showing a VTR cylinder head as in example 3 of the invention.
Figure 7:
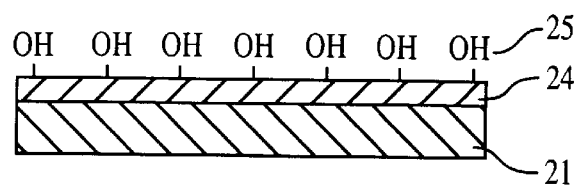
FIG. 7 is a schematic sectional view, enlarged to a molecular level, showing the surface of the VTR cylinder head as in example 3 of the invention.

A chemically adsorbed monomolecular film as in Example 3 and as shown in FIG. 6, was formed on the outer periphery of a rotational cylinder and the surface of a tape guide. The chemically adsorbed monomolecular film had a very low frictional resistance at the time of tape running and was excellently durable. In addition, frictional scars or scratches did not easily form on the tape, and the film was excellently self-lubricating.

As shown above, the self-lubricating film according to the invention is extensively applicable to audio and video apparatus such as the surface of tape recorder magnetic heads (including a de-magnetization head), the surface of a VTR rotational cylinder (including a head), a DAT rotational cylinder surface and bearing section, the surface of a stationary head of VTR or DAT, a tape guide, etc.

As has been shown, according to the invention a chemically adsorbed film, which includes a surface layer containing fluorine groups and a stem layer chemically bonded by siloxane bonds to the substrate, is formed on the substrate surface as a running tape surface, and thus it is possible to reduce the frictional resistance at the time of tape running and thus prevent frictional scars and scratches from being produced on the tape.

Further, with the chemically adsorbed film formed on the lubricating portion surface of an audio or video device, it is possible to provide a device which offers low frictional resistance and is excellently self-lubricating. More specifically, since the surface layer of the chemically adsorbed film contains fluoroalkyl groups, it is possible to reduce the frictional resistance, i.e., the frictional resistance at the time of tape running, and an excellently self-lubricating frictional portion of the device can be obtained. Further, since the stem portion of the chemically adsorbed film is chemically bonded by siloxane bonds to the substrate, an excellently durable film can be obtained which does not readily separate from the substrate surface when the surface is repeatedly run or rubbed. Further, since the chemically adsorbed film according to the invention is very thin, having a thickness on the order of nanometers to angstroms, it will not spoil the dimensional accuracy of the processed machine.

Further, since the chemically adsorbed film according to the invention may be a monomolecular film and may have a thickness at the nanometer level, it is excellently transparent and will not spoil the dimensional accuracy of the processed machine. In addition, it can provide the self-lubricating property without need of any lubricant as well as being excellently durable. Thus, it greatly reduces maintenance.

EXAMPLE 6

Figure 13:
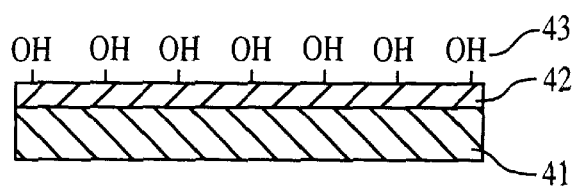
FIG. 13 is a schematic sectional view, showing a pachinko ball as in example 6 of the invention.
Figure 14:
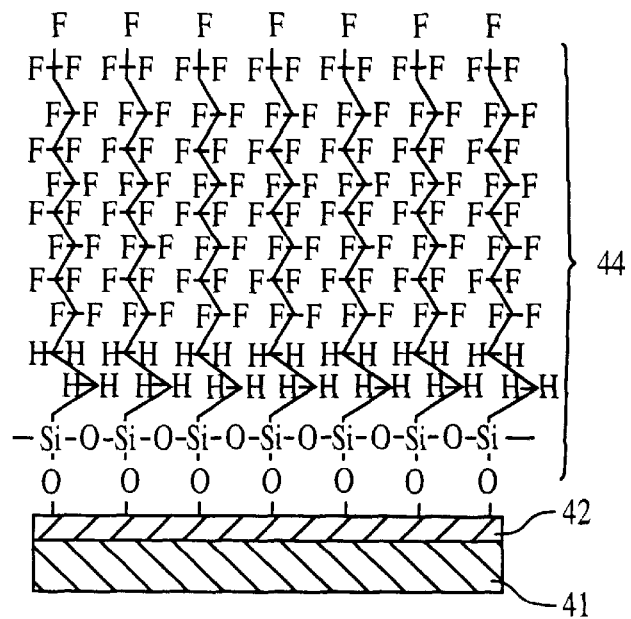
FIG. 14 is a schematic sectional view, enlarged to a molecular level, showing the surface of the pachinko ball after formation of a fluorocarbon-coating monomolecular film as in example 6 of the invention.

A pachinko ball was washed with an organic solution and then dipped and held for about 2 hours in a solution containing a material having a fluorocarbon and a chlorosilane group, e.g., a solution prepared by dissolving about 2 wt. % of $CF_3(CF_2)_7(CH_2)_2SiCl_3$, in a solvent containing 80% by weight of n-hexadecane (or toluene or xylene or dicyclohexyl), 12% by weight of carbon tetrachloride and 8% by weight of chloroform. As a result a dehydrochlorination reaction was brought about between hydroxyl groups 43 numerously present at the surface of a natural oxide film 42 formed on the surface of the pachinko ball 41 (FIG. 13) and between —SiCl groups of the material containing a fluorocarbon and a chlorosilane group. The film was then washed with chloroform to remove unreacted material remaining on the surface, followed by washing with water or exposing to air containing moisture. As a result, bonds of $$CF_3(CF_2)_7(CH_2)_2Si\,(O-)_3$$

were formed on the surface, and a fluorine-containing monomolecular film 44 was formed as above in formulas 1 to 3 (FIG. 14). The film was chemically bonded to the surface of the pachinko ball 41 and had a thickness of about 1.5 nm.

It was very firmly chemically bonded and did not separated.

The above washing step with the chloroform was omitted, and a fluorocarbon polymer film was adsorbed to the substrate. The fluorocarbon-based polymer film was in satisfactorily close contact with the substrate. The film had low frictional resistance and was excellently self-lubricating.

EXAMPLE 7

Figure 15:
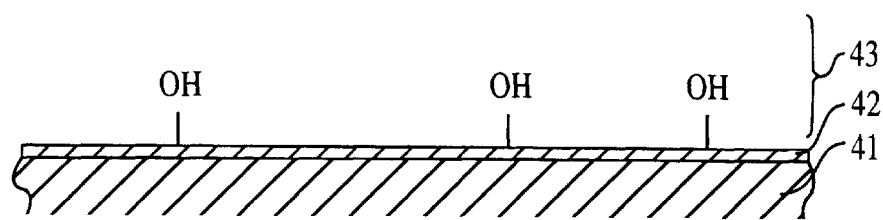
FIG. 15 is a schematic sectional view, showing a bowling ball as in example 7 of the invention.

A bowling ball 41 was dipped and held for about 30 minutes in a solution prepared by dissolving 1% by weight of a material containing a plurality of chlorosilyl groups, e.g., $SiCl_4$ being small in molecular size and highly active with respect to the hydroxyl groups, thus providing a great effect of making the surface of the bowling ball 41 uniformly hydrophilic, in a non-aqueous solvent, e.g., chloroform solvent. As a result, a hydrochloric acid removal reaction was brought about on the surface 42 of the bowling ball 41 due to hydrophilic —OH groups 43 more or less present at the surface 42 (FIG. 15), thus forming a chlorosilane monomolecular film of the material containing a plurality of chlorosilyl groups.

By using SiCl$_4$ as the material containing a plurality of chlorosilyl groups, a dehydrochlorination reaction was brought about on the bowling ball surface 42 due to a small amount of —OH groups exposed at the surface 42. Molecules represented above the formulas 1 and/or 2 were thus secured by —SiO— bonds to the surface.

Figure 16:
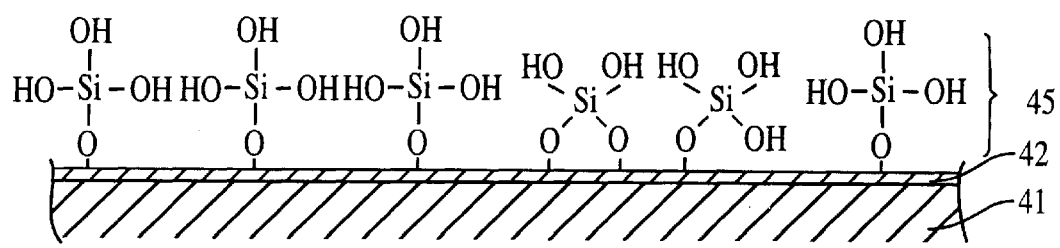
FIG. 16 is a schematic sectional view, showing the surface of the bowling ball provided with a chemically adsorbed film (inner layer) containing a plurality of silanol bonds as in example 7 of the invention.

Subsequently, the bowling ball was washed with a non-aqueous solvent, e.g., chloroform, and then with water, thus removing unreacted SiCl$_4$ particles. A siloxane monomolecular film 44 as represented above in formulas 6 and/or 7 was obtained on the bowling ball surface 42 (FIG. 16).

The above washing step with the chloroform was omitted, and a siloxane-based polymer film was adsorbed to the substrate. The siloxane-based polymer film was in satisfactorily close contact with the substrate.

The monomolecular film 45 thus obtained was perfectly bonded by chemical bonds of —SiO— to the bowling ball surface 42 and did not separate. It had numerous —SiOH bonds at the surface, the bonds corresponding to the initial number of hydroxyl groups.

The bowling ball provided with the monomolecular film formed thereon and containing numerous —SiOH bonds at the surface, was dipped and held for about one hour in a nonaqueous solution containing a material containing a fluorocarbon and a chlorosilane group, e.g., a solution prepared by dissolving about 2% by weight of

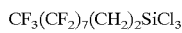

in a solvent containing 80% by weight of hexadecane, 12% by weight of carbon tetrachloride and 8% by weight of chloroform. The film was then washed with chloroform to remove unreacted material remaining on the surface, followed by washing with water or exposing to air containing moisture. As a result, bonds of

Figure 17:
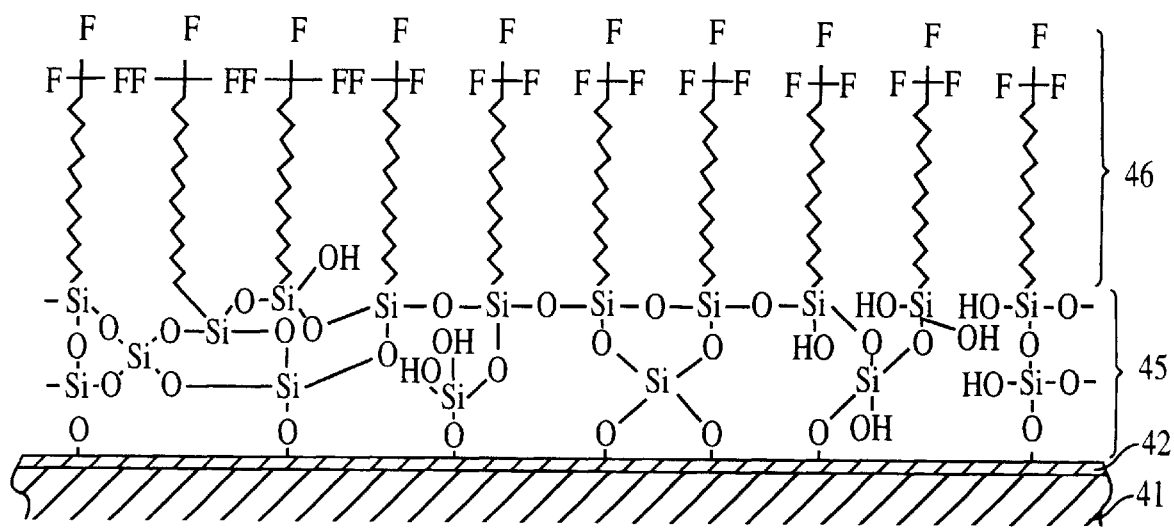
FIG. 17 is a schematic sectional view, enlarged to a molecular level, showing the surface of the bowling ball after formation of a fluorine-coating monomolecular film as in example 7 of the invention.

were formed on the surface, and a fluorine-containing monomolecular film 46 was formed as above in formulas 1 to 3. It was chemically bonded to the inner siloxane monomolecular film 45 and had a thickness of about 1.5 nm (FIG. 17). It did not separate in a peel-off test.

The above washing step with the chloroform was omitted, and a fluorocarbon polymer film was adsorbed to the substrate. The fluorocarbon-based polymer film was in satisfactorily close contact with the substrate. The film had low frictional resistance and was excellently self-lubricating.

As has been shown, the coating film according to the invention is excellently lubricating and water- and oil-repelling, durable and wear-resistant, and it is suitably applicable to game balls used in game machines such as those for pachinko, bowling, smart ball, billiard and roulette games.

Since the chemically adsorbed film according to the invention is chemically bonded by siloxane bonds to the game ball surface, the frictional resistance is low when the ball is rolling. In addition, the film is excellently lubricating and prevents generation of scars and scratches. Further, since the surface layer of the chemically adsorbed film contains fluoroalkyl groups, it has low frictional resistance, i.e., the frictional resistance when the ball is rolling is low. The film is also excellently water- and oil-repelling and anti-contaminating. Further, since it is chemically bonded via siloxane bonds, it is excellently durable and did not readily separate from the substrate surface even if it is repeatedly used for rolling or frictional movement. Further, with the preferred the chemically adsorbed monomolecular film, the film is excellently transparent and does not spoil the dimensional accuracy of the processed game ball. A uniform thickness can also be obtained.

As has been shown, the invention is greatly beneficial to industry.

The invention may be embodied in other specific forms without departing from the spirit or essential characteristics thereof. The present embodiment is to be considered in all respects as illustrative and not restrictive, the scope of the invention being indicated by the appended claims rather than by the foregoing description and all changes which come within the meaning and range of equivalency of the claims are intended to be embraced therein.

We claim:

1. A self-lubricating slide member of a machine part of a device comprising a chemically adsorbed film as a surface layer of said device covalently bonded to said device by —Si— bonds, said chemically adsorbed film comprising fluorocarbon chain groups or hydrocarbon chain groups, wherein said device is selected from the group consisting of an audio apparatus and a video apparatus.

2. The self-lubricating device according to claim 1, wherein said chemically adsorbed film is a monomolecular film or polymer film.

3. The self-lubricating device according to claim 1, wherein the fluorocarbon chain groups comprise several carbon groups and the end of the fluorocarbon chain comprises $CF_3(CF_2)_n$, wherein n is at least 2.

* * * * *